Nov. 10, 1964 M. E. GANT 3,156,130
SPROCKET ARRANGEMENT
Filed July 3, 1961
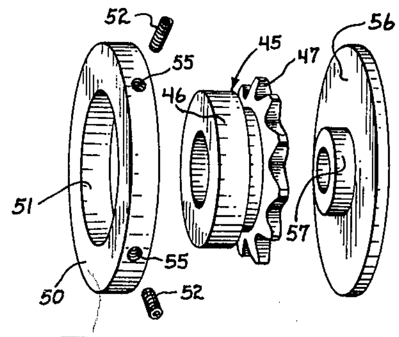
Fig. 3.
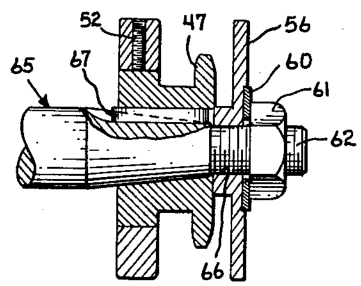
Fig. 4.
Fig. 1.
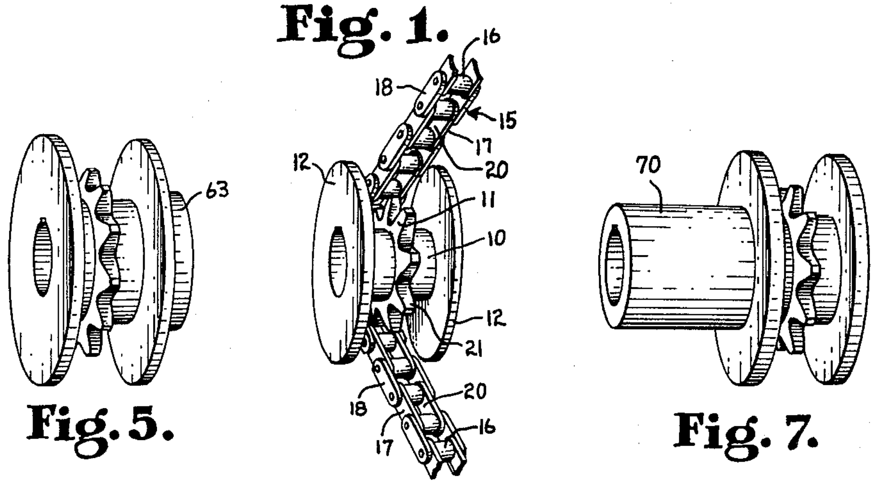
Fig. 5.
Fig. 7.
Fig. 8.
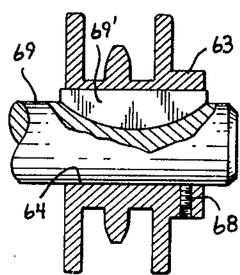
Fig. 6.
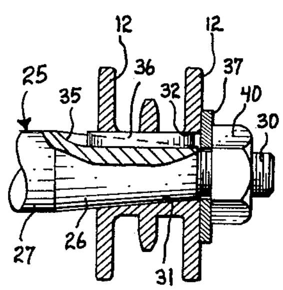
Fig. 2.
70 71 72 75 76
INVENTOR.
MARY E. GANT
BY
Lockwood, Woodard, Smith & Weikart
Attorneys

United States Patent Office 3,156,130
Patented Nov. 10, 1964

3,156,130

SPROCKET ARRANGEMENT

Mary E. Gant, 8204 Westfield Blvd., Indianapolis, Ind.

Filed July 3, 1961, Ser. No. 121,462
2 Claims. (Cl. 74—243)

The present invention relates to a sprocket arrangement finding an important utility in go-cart racing. This application is a continuation-in-part of my application S.N. 69,371, filed November 5, 1960, now abandoned.

One of the most important reasons for pit stops in go-cart racing has been the tendency for the drive chain on the engine sprocket to jump off the sprocket. It can be appreciated that such jumping can frequently mean the difference between winning and losing a race. The tendency to jump can be reduced by tightening the chain; however, such tightening produces other undesirable results such as increased drag on the engine. It is, therefore, one object of the present invention to provide an improved sprocket arrangement which reduces or eliminates the possibility of chain jumping in go-cart racing.

A further object of the present invention is to provide a sprocket arrangement which reduces chain jumping in any sprocket-chain drive such as, for example, in a chain saw.

Another object of the invention is to provide a sprocket arrangement permitting operation with a looser chain.

Still a further object of the present invention is to provide a sprocket arrangement capable of operation at relatively higher r.p.m. and with great and changing stresses being exerted thereon.

Still another object of the present invention is to provide a sprocket arrangement which is dynamically balanced.

Related objects and advantages will become apparent from the following specification, the drawing and the claims.

One embodiment of the present invention comprises a sprocket arrangement including a hub, a sprocket extending radially of the hub and including a plurality of radially extending teeth. There is also provided a pair of annular flanges which extend radially of the hub, are completely separate from the sprocket and are spaced therefrom.

The full nature of the invention will be understood from the accompanying drawings and the following description and claims:

FIG. 1 is a perspective view of the sprocket arrangement of the present invention showing a chain in engagement therewith.

FIG. 2 is a section taken along the axis of the structure of FIG. 1 (showing it mounted upon a shaft).

FIG. 3 is an exploded perspective view of an alternative embodiment of the sprocket arrangement of the present invention.

FIG. 4 is a section of the arrangement of FIG. 3 taken along the axis thereof.

FIG. 5 is a perspective view of a further alternative embodiment of the present invention.

FIG. 6 is a section taken along the axis of the arrangement of FIG. 5.

FIG. 7 is a perspective view of still a further alternative embodiment of the present invention.

FIG. 8 is a section taken along the axis of FIG. 7.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now more particularly to the drawings, there is illustrated in FIG. 1 a sprocket arrangement which includes a hub 10, a sprocket 11 and a pair of flanges 12. A conventional chain 15 such as used on bicycles, chain saws, go-carts and the like, is received on the sprocket 11. This chain includes a plurality of cylindrical portions 16 which are connected together and equally spaced by inner links 17 and outer links 18. These links form with the cylindrical portions 16 a plurality of radially extending openings 20 into which the teeth 21 of the sprocket are inserted as the sprocket rotates.

It can be appreciated that the links 17 and 18 form walls spaced axially of the hub on either side of the teeth 21 and thus, limit the chain from moving axially of the sprocket. In other words, the fact that the teeth 21 are inserted into the openings 20 and the fact that the openings completely surround the teeth resists any tendency for the chain to jump off of the sprocket. Even so, jumping of the chain does occur and is a problem.

It should be emphasized that the partiular construction of the chain and the sprocket make possible an efficient and strong apparatus for transmission of power. The openings 20 are relatively large and the teeth 21 are relatively strong. It should be noted that the proximal ends of the teeth are spaced from the hub 10 and that the teeth taper from a larger proximal end to a smaller distal end, this taper being both in the direction of alignment of the teeth as well as axially of the hub. Furthermore, the teeth are rectangular in cross-section taken perpendicularly to the radii of the hub and therefore, correspond in shape to the rectangular openings 20 in the chain.

The flanges 12 extend radially from the hub and are spaced from the sprocket 11 by a distance sufficiently great to permit free movement of the chain on the sprocket, yet sufficiently small to resist jumping of the chain from the sprocket. Stated in another way, the flanges 12 are spaced from the chain by a distance less than the width of the chain taken axially of the hub. These flanges extend radially a sufficient distance to form a groove therebetween within which the chain travels. Thus, the flanges extend radially substantially a greater distance than do the teeth of the sprocket.

Referring more particularly to FIG. 2, suitable means are provided for mounting the sprocket arrangement upon a shaft 25. In the particular embodiment illustrated in FIGS. 1 and 2, the shaft 25 has a tapered portion 26 joining a cylindrical portion 27 and a relatively smaller threaded portion 30. The hub 10 has a coaxial opening 31 therethrough which has the same taper as the portion 26 of the shaft. The hub is also formed with a keyway 32 as is the tapered portion 26 formed with a keyway 35 both of which keyways receive a key 36 fixing the sprocket arrangement against rotation with respect to the shaft 25. There is also provided a washer 37 and a nut 40 received on the shaft for fixing the sprocket arrangement in place.

Referring to FIGS. 3 and 4, an alternative embodiment of the invention is illustrated which comprises a ring-shaped element 45 having an enlarged cylindrical portion 46 at one end thereof and a sprocket 47 formed on the other end thereof. An annular element 50 having an internal cylindrical opening 51 the same size as the cylindrical portion 46 may be fixed to the cylindrical portion by a pair of Allen head screws 52 threadedly received within threaded bores 55 whose axes are at right angles and intersect the axis of the annular element. The annular element 50 along with a further annular element 56 functions similarly to the flanges 12 of FIGS. 1 and 2 to retain the chain upon the sprocket 47. The annular element 56 is formed with a boss 57 which is held in engagement with the element 45 by means of a washer 60 and a nut 61 received upon the threaded portion 62 of shaft 65.

Similarly to the above described embodiment, the present arrangement may be used upon a tapered shaft in that the bore 66 through the annular element 56 is substantially smaller than the bore through the element 45. In the present embodiment, the sprocket 47 is identical in configuration to the sprocket of FIGS. 1 and 2 although various sizes and shapes of sprockets may be provided in any of the embodiments of the present invention. It should be mentioned, however, that the ring-shaped element 45 with its sprocket is actually a conventional sprocket and thus, the annular elements 50 and 56 make possible conversion of a conventional sprocket into the improved sprocket arrangement of the present invention. The ring-shaped element 45 is fixed against rotation by means of a key 67 received within suitable keyways in the shaft 65 and the element 45.

The embodiments of FIGS. 1, 2, 5, 6, 7 and 8 are all formed integrally. That is, the hub, sprocket and flanges thereof are all in one piece. This is an advantage because it makes possible dynamic balancing of the parts which might be lost in, for example, welding of the various parts together or tightening of the screws 52 in the embodiment of FIGS. 3 and 4. This dynamic balance is extremely important when the sprocket arrangements of the present invention are used with a chain saw or a chain saw motor as in go-cart racing because the crankshaft of the motor rotates at approximately 15,000 r.p.m.

The manufacture of the device illustrated in FIGS. 3 and 4 is believed to be relatively obvious especially in view of the fact that the member 45 is conventional. The structures of FIGS. 1, 2 and 5–8 are manufactured by first forming the central bore or opening such as 31 in FIG. 2. An automatic screw machine then provides the general shape of the sprocket arrangement but without cutting the teeth. In other words, the flanges 12 are formed and an annular central flange which later becomes the sprocket is also formed. The keyway in the central opening is then broached.

The blank is then placed upon a fixture having an indexing mechanism capable of indexing the blank through 360° by a number of movements equal to the number of teeth desired. An end mill is then moved radially inwardly of the blank as near one flange 12 as possible. As soon as the end mill reaches its innermost location, it is swung over adjacent the other flange, then back to the first flange and then out. This end mill has the same shape taken in axial section as the space between each of the teeth of the sprocket. After the cutting of each space between the teeth, the fixture is indexed to the next location for the cutting of the next space. After the milling operation, the sprocket arrangements are brushed and buffed and heat treated. The material used for the sprocket arrangement should be of such a nature as to be highly resistant to changing stresses upon the sprocket in order to resist breakage of the teeth thereof.

Referring to FIGS. 5 and 6, an alternative embodiment of the invention is illustrated which is generally similar to the structure of FIGS. 1 and 2 with the exception that a collar 63 is formed on one end of the structure. Also the opening or bore 64 through the center of the sprocket arrangement is cylindrical rather than tapered. The sprocket arrangement of FIGS. 5 and 6 is prevented against axial movement by means of a set screw 68 and against rotational movement with respect to the shaft 69 by means of a key 69' received in suitable keyways in the shaft 69 and sprocket arrangement.

Referring to FIG. 7, a still further embodiment of the invention is illustrated which is generally similar to the embodiments of FIGS. 1 and 2, and 5 and 6 but which includes an elongated collar 70 formed integrally therewith. This collar may be used as in FIG. 8 to properly space the sprocket arrangement from the engine. The sprocket of FIGS. 7 and 8 is secured to the crankshaft 71 of the engine for rotation therewith by means of the key 72, washer 75 and the nut 76, the key 72 being received within suitable keyways in the sprocket arrangement and crankshaft 71 and the nut 76 being threadedly received upon the threaded end of the shaft 71. The various embodiments illustrated in FIGS. 1, 2, 5, 6, 7 and 8 are intended for use on various makes of engines such as McCulloch and Homelite, West Bend, Clinton and Power Products, It will be obvious that the present invention could be modified to adapt it for attachment to the crankshaft of various other motors or to any shaft.

It should be made clear that in all of the illustrated embodiments of the present invention, the flanges, such as 12, 50 and 56, are all spaced a sufficient distance from the sprocket of the particular sprocket arrangement to permit free and loose operation of the chain on the sprocket. However, each flange of all illustrated embodiments is located sufficiently close to the sprocket and extends a sufficient distance radially beyond the sprocket teeth to prevent jumping of the chain from the sprocket. Stated in another way, the flanges are spaced from the sprocket a distance less than the width of the chain.

From the above description, it will be obvious that the present invention provides an improved sprocket arrangement which reduces or eliminates the possibility of the chain jumping from the sprocket. The present invention also permits operation with a looser chain because the flanges retain the chain upon the sprocket. It will also be appreciated that the sprocket arrangement of the present invention permits operation at a relatively high speed and with great and changing stresses because of the strong, stubby shape of the teeth and the fact that the teeth can have a relatively thick shape without interfering with the efficient drive transmitted by the sprocket and chain. It will also be clear that the integral nature of the emodiments of FIGS. 1, 2 and 5–8 makes possible improved dynamic balancing of the sprocket arrangement. This one-piece structure also decreases the weight of the sprocket arrangement and improves the fit thereof on the supporting shaft.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An integral sprocket arrangement comprising a hub, a sprocket extending radially of said hub and including a plurality of radially extending teeth, a pair of annular flanges extending radially of said hub a greater distance than said teeth, a sprocket spacing collar extending axially a substantial distance from one side of said hub, and a chain received on said sprocket, said flanges each having a flat inner surface perpendicular to the axis of a supporting shaft and extending radially outwardly to the outer periphery of the respective flange, said flange surfaces being spaced from said chain a distance less than the width of said chain taken axially of said hub, said spacing collar being of a predetermined length to automatically space said sprocket on said shaft when secured thereon, said integral hub, sprocket, flanges, and spacing collar also providing a balanced rotative unit.

2. A sprocket arrangement comprising a ring-shaped element having a cylindrical shape at one end thereof, a sprocket formed integrally of said element at the other end thereof, said sprocket including a plurality of aligned radially extending teeth, an annular element having an internal cylindrical opening of the same size as the one end of said ring-shaped element, means for securing said annular element about the one end of said ring-shaped element in spaced relation to said sprocket, a further annular element having an annular boss on one face thereof, and means for securing said further element against said ring-shaped element with said boss in engagement with the other end of said ring-shaped element, said annular elements each having a flat inner surface which extends radially out to the outer periphery of the respective annular element, said outer peripheries defining a circular configuration in radial section, said annular element surfaces being spaced from said sprocket and extending radially a greater distance than said teeth.

References Cited in the file of this patent

UNITED STATES PATENTS

| | | |
|---|---|---|
| 1,181,175 | Shapiro | May 2, 1916 |
| 1,535,114 | Edmunds | Apr. 28, 1925 |
| 2,673,471 | Kline et al. | Mar. 30, 1954 |
| 3,001,412 | Babbitt | Sept. 26, 1961 |

FOREIGN PATENTS

| | | |
|---|---|---|
| 335,746 | Great Britain | Oct. 2, 1930 |
| 427,148 | Italy | Nov. 13, 1947 |